United States Patent [19]

Gonda

[11] Patent Number: 4,808,870
[45] Date of Patent: Feb. 28, 1989

[54] ELECTROMAGNETIC CLUTCH WITH IMPACT ABSORBING CONNECTOR

[75] Inventor: Hideyuki Gonda, Isesaki, Japan

[73] Assignee: Sanden Corporation, Gunma, Japan

[21] Appl. No.: 103,344

[22] Filed: Oct. 1, 1987

[30] Foreign Application Priority Data

Oct. 6, 1986 [JP] Japan .................... 61-152437[U]

[51] Int. Cl.⁴ .................... H02K 5/24; F16D 3/12; F16D 3/77; F16D 27/10
[52] U.S. Cl. .................... 310/78; 192/84 C; 310/51
[58] Field of Search ............ 192/84 C, 84 B; 310/51, 310/78, 91, 76, 90

[56] References Cited

U.S. PATENT DOCUMENTS

| | | |
|---|---|---|
| 3,044,594 | 11/1958 | Bernard . |
| 3,082,933 | 12/1960 | Bernard . |
| 3,205,969 | 9/1965 | Mantey . |
| 3,325,760 | 6/1967 | Bernard . |
| 3,384,213 | 5/1968 | Bernard et al. . |
| 3,425,529 | 2/1969 | Hayashi . |
| 3,455,421 | 7/1969 | Miller . |
| 3,565,223 | 2/1971 | Pierce . |
| 3,774,739 | 11/1973 | Higuchi . |
| 4,187,939 | 2/1980 | Silvestrini et al. ............ 192/84 C |
| 4,194,607 | 3/1980 | Yamaguchi . |
| 4,225,027 | 9/1980 | Takefuta et al. . |
| 4,243,128 | 1/1981 | Shirai . |
| 4,262,787 | 4/1981 | Takefuta et al. . |
| 4,273,226 | 6/1981 | Takefuta et al. . |
| 4,287,976 | 9/1981 | Sakaki et al. . |
| 4,391,356 | 7/1983 | Takemura et al. . |
| 4,441,864 | 4/1984 | Watts et al. . |
| 4,493,407 | 1/1985 | Newton ............ 192/84 C |
| 4,574,930 | 3/1986 | Koitabashi . |
| 4,602,176 | 7/1986 | Baker ............ 310/51 |
| 4,616,742 | 10/1986 | Matsushita . |
| 4,619,351 | 10/1986 | Takatoshi ............ 192/35 |
| 4,624,354 | 11/1986 | Koitabashi . |
| 4,694,945 | 9/1987 | Koitabashi . |
| 4,718,526 | 1/1988 | Koitabashi . |

FOREIGN PATENT DOCUMENTS

| | | |
|---|---|---|
| 53-122047 | 10/1978 | Japan . |
| 1180697 | 2/1970 | United Kingdom . |
| 1549710 | 8/1979 | United Kingdom . |
| 2127913 | 4/1984 | United Kingdom . |

OTHER PUBLICATIONS

European Search Report.
U.S. Ser. No. 637,799 filed 08-06-84 (Sanden).
U.S. Ser. No. 010,466 filed 02-03-87 (Sanden).
U.S. Ser. No. 031,705 filed 03-30-87 (Sanden).
U.S. Ser. No. 067,880 filed 06-30-87 (Sanden).
U.S. Ser. No. 067,879 filed 06-30-87 (Sanden).
U.S. Ser. No. 035,385 filed 04-07-87 (Sanden).

*Primary Examiner*—Patrick R. Salce
*Assistant Examiner*—D. L. Rebsch
*Attorney, Agent, or Firm*—Banner, Birch, McKie & Beckett

[57] ABSTRACT

An electromagnetic clutch includes a first rotatable member supported on a first bearing, and connected to an external driving source having an axial magnetic end plate. A second rotatable member is connected to a driven member. An annular magnetic member is supported on the second rotatable member through a plurality of leaf springs so as to be capable of axial movement, and faces the axial end plate of the first rotatable member with an axial gap therebetween. A third rotatable member is connected to the second rotatable member, to limit the axial movement of the annular magnetic member. An electromagnet is associated with one of rotatable members and the annular magnetic member for transmitting rotational force from the external driving source to the other of the rotatable members. Plural resilient core connecting devices are fixed between the annular magnetic member and the third rotatable member, to absorb vibration and impact noise at the time of attraction of the annular magnetic member to the first rotatable member, as well as support the annular magnetic member.

18 Claims, 2 Drawing Sheets

4,808,870

ELECTROMAGNETIC CLUTCH WITH IMPACT ABSORBING CONNECTOR

TECHNICAL FIELD

This invention relates to an electromagnetic clutch, such as for use in controlling the transmission of power from an automobile engine to a refrigerant compressor in an automotive air conditioning system, and more particularly, to an improved connecting structure between a armature plate and a stopper plate for reducing impact noise when the armature plate is attracted to a rotor.

BACKGROUND OF THE INVENTION

Generally, there are two types of well-known electromagnetic clutches which include a structure to receive rotational and attractive forces; one type includes a plurality of leaf springs to receive the above forces and the other type includes a plurality of rubber members to receive these forces.

In the electromagnetic clutches including the leaf springs, when the electromagnetic clutch is energized, an armature plate is attracted to one end surface of a rotor against the recoil strength of the leaf springs. As the axial air gap between the armature plate and the rotor is made smaller, the higher attractive force is generated for attracting the armature plate to the rotor becomes higher. Therefore, the attractive velocity of the armature plate to the rotor also increases as the distance between the armature plate and the rotor is reduced. Although the attractive velocity of the armature plate to the rotor is low at the early stage of attracting motion, as the axial air gap becomes smaller, the attractive force becomes higher. The attractive force of the armature plate to the rotor is thus increasing when the velocity of the armature plate is likewise increasing. Therefore, when the armature plate is attracted to the rotor, large impact noise and vibration is produced between the armature plate and the rotor.

On the other hand, in an electromagnetic clutch which uses rubber members, durability of the rubber members and keeping the rubber members attached becomes a problem because when the armature plate is attracted to the rotor, great impact force in the rotational direction is applied to the rubber members.

SUMMARY OF THE INVENTION

It is a primary object of this invention to provide an electromagnetic clutch with a structure which can reduce impact noise and vibration when an armature plate is attracted to a rotor.

It is another object of this invention to provide an electromagnetic clutch with a structure which has high durability.

An electromagnetic clutch according to the present invention includes a first rotatable member which is rotatably supported on a first bearing. The first rotatable member is connected to an external driving source and has an axial magnetic end plate. A second rotatable member is connected to a driven member. An annular magnetic member is supported on the second rotatable member through a plurality of leaf springs so as to be capable of axial movement and faces the axial end plate of the first rotatable member with an axial gap therebetween. A third rotatable member is connected to the second rotatable member to limit the axial movement of the annular magnetic member. An electromagnet is associated with one of rotatable members and the annular magnetic member for transmitting rotational force from the external driving source to the other of the rotatable members by pulling the annular magnetic member into contact with the end plate. A connecting device is fixedly disposed between the annular magnetic member and the third rotatable member so as to absorb vibration and impact noise at the time of attraction of the annular magnetic member to the first rotatable member.

Further objects, features and other aspects of this invention will be understood from the following detailed description of preferred embodiments of this invention with reference to the annexed drawings.

DETAILED DESCRIPTION OF THE PREFERRED EMBODIMENTS

Figure 1:
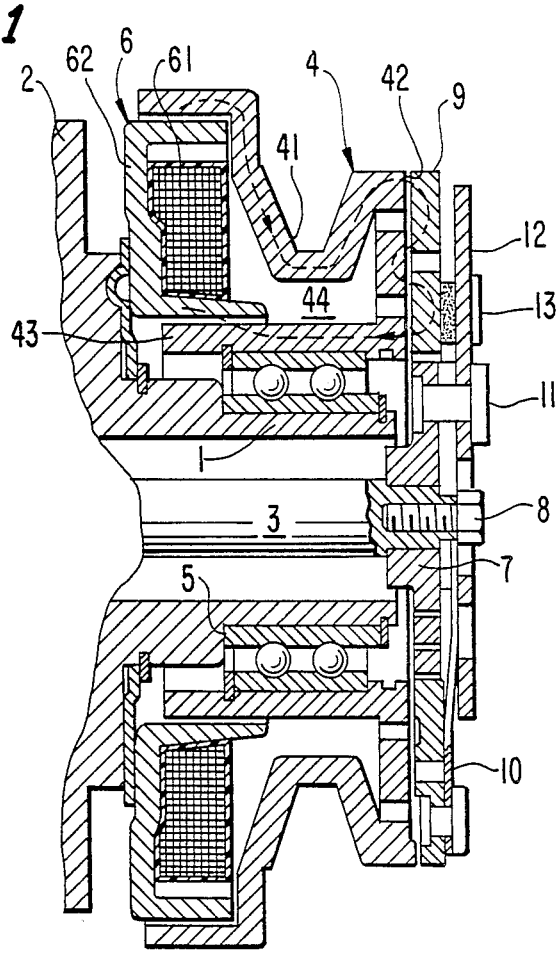
FIG. 1 is a cross-sectional view of an electromagnetic clutch with connecting structure in accordance with one embodiment of this invention.
Figure 2:
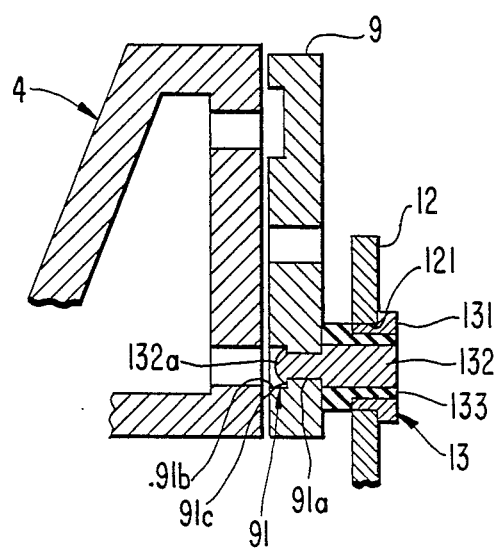
FIG. 2 is an enlarged cross-sectional view of a part of an electromagnetic clutch with the connecting structure shown in FIG. 1.

With reference to FIGS. 1 and 2, the construction of an electromagnetic clutch with a connecting structure in accordance with one embodiment of this invention is shown. An electromagnetic clutch is mounted on the outer peripheral portion of annular extension 1 which projects from an end surface of compressor housing 2 and surrounds a drive shaft 3. Drive shaft 3 is rotatably supported in compressor housing 2 by a bearing (not shown). The electromagnetic clutch includes a rotor 4 (a first rotatable member) which is rotatably mounted on the outer surface of annular extension 1 through a bearing 5 and driven by an automobile engine (not shown) through a belt (not shown). Rotor 4 includes an annular V-shaped groove 41 to receive the belt, a disc-shaped frictional surface 42 and a cylindrical portion 43 which is fixedly disposed on the outer surface of bearing 5.

An electromagnet 6, which includes an electromagnetic coil 61, is fixed on one end surface of compressor housing 2 and is disposed within an annular hollow portion 44 of rotor, 4. Rotor 4 surrounds coil 61 in such a manner so as to define a surrounding air gap about coil 61. A terminal end of drive shaft 3 extends from annular extension 1, and a hub 7 (a second rotatable member) is fixed on the terminal end of drive shaft 3 by securing bolt 8. The axial end surface of an armature plate 9 is fixedly joined to hub 7 by a plurality of leaf springs 10, which are fixed on the outer end surface of armature plate 9 at one end by rivets in such a fashion that the inner end surface of armature plate 9 faces frictional surface 42 of rotor 4 with an axial air gap therebetween Leaf springs 10 permit armature plate 9 to move axially toward rotor 4. A stopper plate 12 (a third rotatable member) is coupled to hub 7 together with leaf springs 10 on the outer end surface of hub 7 so as to be able to limit the axial movement of armature plate 9 within a certain range.

The conventional slanted orientation of a plurality of leaf springs connected between an armature plate and a third rotatable member is illustrated in U.S. Pat. No. 4,493,407 to Newton, which is hereby incorporated by reference.

A plurality of connecting devices 13 are disposed between armature plate 9 and stopper plate 12 to form a connection therebetween. Each connecting device 13 includes a retaining member 131, a pin member 132 which is provided with projecting portion 132a, and a rubber member 133, which are all connected to one another, preferably by vulcanizing. Rubber member 133 includes a first portion which is disposed in a radial gap between retaining member 131 and pin member 132, and a second portion which is disposed between the outer end surface of armature plate 9 and the inner end surface of stopper plate 12.

Connecting device 13 formed by these three members is attached to stopper plate 12 by press fitting into an aperture 121, which is formed through stopper plate 12. Retaining member 131 has an annular lip which contacts the outer end surface of stopper plate 12. Projecting portion 132a of pin member 132 is inserted into an aperture 91, which is formed through armature plate 9 and includes a narrow portion 91a and a wide portion 91b connected by a step portion 91c. The terminal end of projecting portion 132a is then caulked, to form an enlarged tip which contacts step portion 91c to thereby secure pin 132 to armature plate 9.

When electromagnetic coil 61 is energized, magnetic flux, as shown by a dashed arrow, is produced around electromagnet 6. Armature plate 9, which is an annular magnetic member, is thus attracted to frictional surface 42, which is an axial magnetic end plate of rotor 4, against the recoil strength of leaf springs 10. Rotational force from the automobile engine is transmitted to armature plate 9 through rotor 4 and armature plate 9 is rotated with rotor 4. Rotational force between armature plate 9 and rotor 4 is absorbed by leaf springs 10.

Impact noise and vibration, which is conventionally produced at the time of attraction of armature plate 9 to frictional surface 42, is absorbed by connecting devices 13 through their rubber members 133 and pin member 132 by deformation of rubber member 133. The absorption of the impact noise and vibration is accomplished by rubber members 133 of connecting devices 13, which deform in the axial direction only since rotation forces are absorbed by the leaf springs. It has been found that this division of absorption functions enhances durability of the rubber members, while accomplishing both the function of reducing vibration and impact noise and absorbing rotational force.

Figure 3:
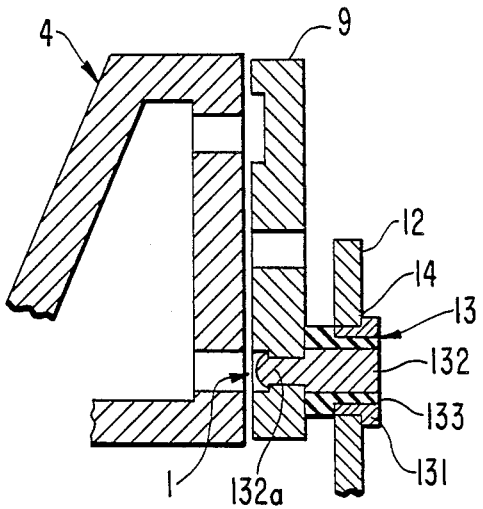
FIG. 3 is an enlarged cross-sectional view of a part of an electromagnetic clutch with a connecting structure modified in accordance with another embodiment of this invention.

With reference to FIG. 3, the construction of a part of an electromagnetic clutch with a connecting structure in accordance with another embodiment of this invention is shown. The structure of this electromagnetic clutch is the same as that shown in FIG. 1. Therefore, the same structure and parts as that shown in FIG. 1 are accorded the same reference numerals and the description is omitted, to simplify the explanation.

In this embodiment, retaining member 131 of connecting device 13 is fixed within aperture 121 of stopper plate 12 by welding or caulking along the annular lip of retaining member 131 at the location of reference numeral 14.

Figure 4:
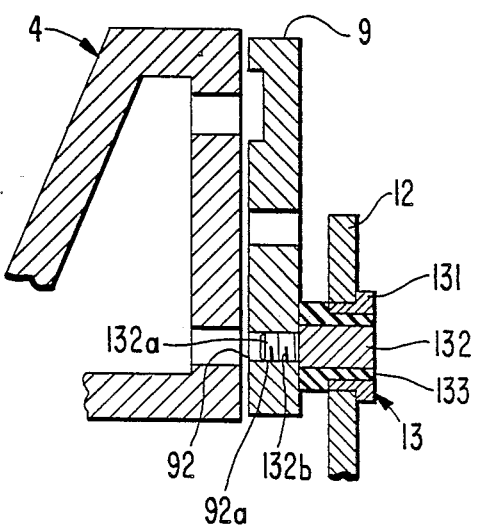
FIG. 4 is an enlarged cross-sectional view of a part of an electromagnetic clutch with connecting structure modified in accordance with a further embodiment of this invention.

Referring to FIG. 4, the construction of a part of an electromagnetic clutch with a connecting structure in accordance with a further embodiment of this invention is shown. The structure of this electromagnetic clutch is the same as that shown in FIG. 1. Therefore, the same structure and parts as that shown in FIG. 1 are accorded the same reference numerals and the description is omitted, to simplify the explanation.

In this embodiment, a screw thread 132b is formed on the outer surface of projecting portion 132a of pin member 132; and a screw thread 92a is formed on the inner surface of aperture 92. Connecting device 13 is fixed on the outer end surface of armature plate 9 by screwing projecting portion 132a of pin member 132 into the threaded aperture 92 of armature plate 9.

This invention has been described in detail in connection with the preferred embodiment but these are examples only and the invention is not restricted thereto. It will be easily understood by those skilled in the art that other variations and modifications can be easily made within the scope of this invention.

I claim:

1. In an electromagnetic clutch including a first rotatable member for connection to an external driving source, said first rotatable member being rotatably supported on a first bearing and having an axial magnetic end plate, a second rotatable member for connection to a driven member, an annular magnetic member connected to said second rotatable member through a plurality of leaf springs so as to be capable of axial movement and facing said axial end plate of said first rotatable member with an axial gap therebetween, a third rotatable member connected to said second rotatable member to limit the axial movement of said annular magnetic member, and electromagnetic means associated with said first rotatable member and said annular magnetic member for transmitting rotational force from the external driving source to the other of said rotatable members by attracting said annular magnetic member to said magnetic end plate, said leaf springs being arranged to absorb rotational force when said second rotatable member is rotated with said first rotatable member, the improvement comprising securing and absorbing means fixedly disposed between said annular magnetic member and said third rotatable member for securing said annular magnetic member t said third rotatable member and for absorbing vibration and impact noise at the time of attraction in the axial direction of said annular magnetic member to the magnetic end plate of said first rotatable member.

2. An electromagnetic clutch of claim 1 wherein one end of said securing means is secured to said annular magnetic member and the other end of said securing means is secured to said third rotatable member.

3. The electromagnetic clutch of claim 1 or 2 wherein said securing means includes a deformable rubber member.

4. The electromagnetic clutch of claim 3 wherein said securing means includes a pin member fixed to said annular magnetic member and said rubber member fixed to the outer surface of said pin member.

5. The electromagnetic clutch of claim 3 wherein said securing means includes a pin connected between s id annular magnetic member and said third rotatable member, said deformable rubber member surrounds at least a portion of said pin and includes a portion disposed between an outer end surface of said annular magnetic member and an inner end surface of said third rotatable member.

6. The electromagnetic clutch of claim 3 wherein said securing means includes an annular retaining member fixed to said third rotatable member, a pin member disposed within said annular retaining member with a radial gap between said pin member and said annular retaining member, said pin member being fixed to said annular magnetic member, and said rubber member having a first portion disposed in said radial gap and a second portion between the outer end surface of said annular magnetic member and the inner end surface of said third rotatable member 7. The electromagnetic clutch of claim 6 wherein said annular retaining member has an annular lip overlaying the outer end surface of said third rotatable member.

8. The electromagnetic clutch of claim 7 wherein said annular lip is welded or caulked to said outer end surface of said third rotatable member.

9. The electromagnetic clutch of claim 6 wherein an aperture is formed in said annular magnetic member and said pin is fixed within said aperture.

10. The electromagnetic clutch of claim 9 wherein said aperture in said annular magnetic member has a narrow portion and a wide portion with a step portion therebetween, and said pin has an enlarged terminal end contacting said step portion to secure said pin in said aperture.

11. The electromagnetic clutch of claim 9 wherein said aperture has an internal threaded portion and said pin has an outer threaded portion for screwing into said threaded portion of said aperture.

12. In an electromagnetic clutch including a first rotatable member for connection to an external driving source, said first rotatable member being rotatably supported on a first bearing and having an axial magnetic end plate, a second rotatable member for connection to a driven member, an annular magnetic member connected to said second rotatable member through a plurality of leaf springs so as to be capable of axial movement and facing said axial end plate of said first rotatable member with an axial gap therebetween, a third rotatable member connected to said second rotatable member to limit the axial movement of said annular magnetic member, and electromagnetic means associated with said first rotatable member and said annular magnetic member for transmitting rotational force from the external driving source to the other of said rotatable members by attracting said annular magnetic member to said magnetic end plate, said leaf springs being arranged to absorb rotational force when said second rotatable member is rotated with said first rotatable member, the improvement comprising connecting and absorbing means fixedly disposed between said annular magnetic member and said third rotatable member for connection said annular magnetic member to said third rotatable member and for absorbing vibration and impact noise at the time of attraction in the axial direction of said annular magnetic member to the magnetic end plate of said first rotatable member, said connecting means including a deformable rubber member and a pin, said pin being connected between said annular magnetic member and said third rotatable member, said deformable rubber member surrounding at least a portion of said pin and including a portion disposed between an outer end surface of said annular magnetic member and an inner end surface of said third rotatable member.

13. In an electromagnetic clutch including a first rotatable member for connection to an external driving source, said first rotatable member being rotatably supported on a first bearing and having an axial magnetic end plate, a second rotatable member for connection to a driven member, an annular magnetic member connected to said second rotatable member through a plurality of leaf springs so as to be capable of axial movement and facing said axial end plate of said first rotatable member with an axial gap therebetween, a third rotatable member connected to said second rotatable member to limit the axial movement of said annular magnetic member, and electromagnetic means associated with said first rotatable member and said annular magnetic member for transmitting rotational force form the external driving source to the other of said rotatable members by attracting said annular magnetic member to said magnetic end plate, said leaf springs being arranged to absorb rotational force when said second rotatable member is rotated with said first rotatable member, the improvement comprising connecting and absorbing means fixedly disposed between said annular magnetic member and said third rotatable member for connecting said annular magnetic member to said third rotatable member and for absorbing vibration and impact noise at the time of attraction in the axial direction of said annular magnetic member to the magnetic end plate of said first rotatable member, said connecting means including a deformable rubber member, an annular retaining member and a pin, said annular retaining member being fixed to said third rotatable member, said pin member being disposed within said annular retaining member with a radial gap between said pin member and said annular retaining member, fixed to said annular magnetic member, and said rubber member having a first portion disposed in said radial gap and a second portion between the outer end surface of said annular magnetic member and the inner end surface of said third rotatable member.

14. The electromagnetic clutch of claim 13 wherein said annular retaining member has an annular lip overlaying the outer end surface of said third rotatable member.

15. The electromagnetic clutch of claim 14 wherein said annular lip is welded or caulked to said outer end surface of said third rotatable member.

16. The electromagnetic clutch of claim 13 wherein an aperture is formed in said annular magnetic member and said pin is fixed within said aperture.

17. The electromagnetic clutch of claim 16 wherein said aperture in said annular magnetic member has a narrow portion and a wide portion with a step portion therebetween, and said pin has an enlarged terminal end contacting said step portion to secure said pin in said aperture.

18. The electromagnetic clutch of claim 16 wherein said aperture has an internal threaded portion and said pin has an outer threaded portion for screwing into said threaded portion of said aperture.

* * * * *